United States Patent [19]

Wagner et al.

[11] Patent Number: 4,538,819
[45] Date of Patent: Sep. 3, 1985

[54] LEAD GASKET FOR ELECTRIC MOTORS

[75] Inventors: Paul D. Wagner, Cincinnati; Edward F. Cooney, Norwood, both of Ohio

[73] Assignee: Siemens-Allis, Inc., Atlanta, Ga.

[21] Appl. No.: 188,900

[22] Filed: Sep. 19, 1980

[51] Int. Cl.³ .............................................. F16J 15/16
[52] U.S. Cl. .......................................... 277/4; 277/12; 285/4; 52/58
[58] Field of Search .................. 277/4, 12; 285/42, 3, 285/4, 177; 52/199, 58

[56] References Cited

U.S. PATENT DOCUMENTS

| | | | |
|---|---|---|---|
| 3,724,862 | 4/1973 | Biffle | 277/4 |
| 3,807,110 | 4/1974 | Kaminski | 285/4 |
| 3,827,704 | 8/1974 | Gillemot et al. | 277/4 |

FOREIGN PATENT DOCUMENTS 1307295  9/1962  France ................. 285/177

Primary Examiner—Robert I. Smith
Attorney, Agent, or Firm—F. W. Powers; J. L. James

[57] ABSTRACT

An improved gasket sealing motor leads which extend from the interior of an electric motor enclosure. The gasket is provided with one or more resilient, conical bushings whose diameters extend through a wide range of lead diameters. By severing the bushings at an appropriate point, round apertures are formed through which the leads can be pulled and sealed. The flat portion of the gasket which surrounds the bushings is secured to the motor enclosure in a conventional manner.

3 Claims, 4 Drawing Figures

LEAD GASKET FOR ELECTRIC MOTORS

BACKGROUND OF THE INVENTION

The present invention relates to electric motor enclosures, and more particularly to an improved resilient gasket for sealing the opening through which the motor leads pass.

Depending upon their application electric motors require various degrees of enclosure, both to protect the internal portions of the motor from dirt build-up, corrosion, and damage but also to shield the surrounding environment from heat or electrical discharges which may occur within the motor. Types of motors in common use range from open-style motors through totally-enclosed, fan cooled (TEFC) motors to explosion-proof motors. Various techniques have been developed for sealing motor enclosures, depending upon the environment in which the motor is to operate, and to meet the requirements of industrial, government, and military standards. For many applications, it is necessary that the cables or leads which conduct current to the motor windings, and which necessarily pass through the motor enclosure, be sealed so as to prevent moisture, dirt and other foreign materials from entering the motor. At the same time, it is desirable that the lead-sealing means be easily removable in the event that the motor has to be repaired.

For typical industrial applications, from 3 to 9 leads extend from the motor enclosure, typically through a large, common opening. Depending upon the application and type of motor the opening may be closed by various means including gaskets, bulk sealing material, and/or a removable outside housing coupled to a conduit.

In some approaches a flat, resilient gasket is secured across an opening in the motor enclosure and holes or slits cut in the gasket to allow the leads to extend therethrough. This approach has the disadvantage of requiring specifically-sized apertures or the use of circular cutters for providing a round aperture which will seal evenly around each lead.

By simply cutting a slit in the material, a satisfactory seal may not be achieved. If the gaskets are pre-cut, they are obviously not usable with lead sizes which do not match the pre-cut holes. In an effort to obtain a better degree of sealing, lead openings are frequently sealed by filling them with a substance which will cure or set, and in that manner permanently seal the opening about the leads. This method has the disadvantage of being awkward and messy in a production line environment, and further requiring that the motor be held in a proper position until the sealing material hardens. Still further, when it is necessary to repair the motor or to replace the leads the sealing material must be destroyed, and cannot be re-used but instead the sealing or encapsulation step must be redone. Accordingly, it will be appreciated that it would be highly desirable to provide an improved lead seal gasket for an electric motor which overcomes the above-mentioned disadvantages.

It is therefore an object of the present invention to provide an improved lead seal gasket for an electric motor.

Another object is to provide a lead seal gasket which is adaptable for use with leads of various sizes.

Still another object is to provide a lead sealing means which can be reused, which yet provides a uniform, tight seal about each lead.

SUMMARY OF THE INVENTION

Briefly stated, in accordance with one aspect of the invention the foregoing objects are achieved by providing a gasket having a generally planar portion which extends across the opening in a motor enclosure through which the motor leads pass. The gasket also comprises at least one generally conical lead bushing upstanding from the planar part of the gasket, and which can be severed at an appropriate point to form a hole for a lead to pass through. In a preferred embodiment, the external surface of the lead bushing is stepped so as to provide a guide to allow the bushing to be severed at an appropriate point for a given lead size.

When the bushing is severed, this forms a circular opening through which a lead may pass. Since the lead has a generally circular cross section, it is tightly gripped around its periphery by the resilient bushing, thus providing an improved lead seal.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment taken in conjunction with the accompanying drawing in which:

DESCRIPTION OF A PREFERRED EMBODIMENT

Figure 1:
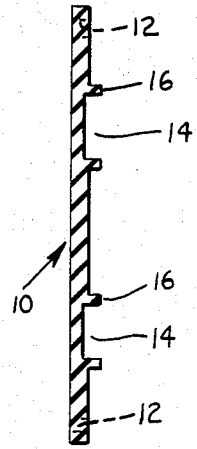
FIG. 1 is a transverse section of a motor lead gasket taken at I—I of FIG. 2.

FIG. 1 illustrates one manner in which motor lead gaskets are presently formed. A gasket 10 comprises a generally planar sheet of resilient material, which is frequently square or oblong in shape to cover a correspondingly-shaped opening in a motor enclosure through which the motor leads pass. A series of holes 12 may be provided about the periphery of the gasket so that it can be captured between the motor frame and a mounting plate, the bolts which secure the mounting plate extending through the gasket to hold it in place across the opening. A series of generally circular depressions 14 are molded at appropriate positions upon the gasket. In some instances, these depressions are surrounded by annular ridges 16. The inside diameters of ridges 16 usually correspond to the diameter of the largest leads which are expected to be used with a given motor. Typically nine depressions are molded into the gasket, either three or six leads ordinarily being used.

Figure 2:
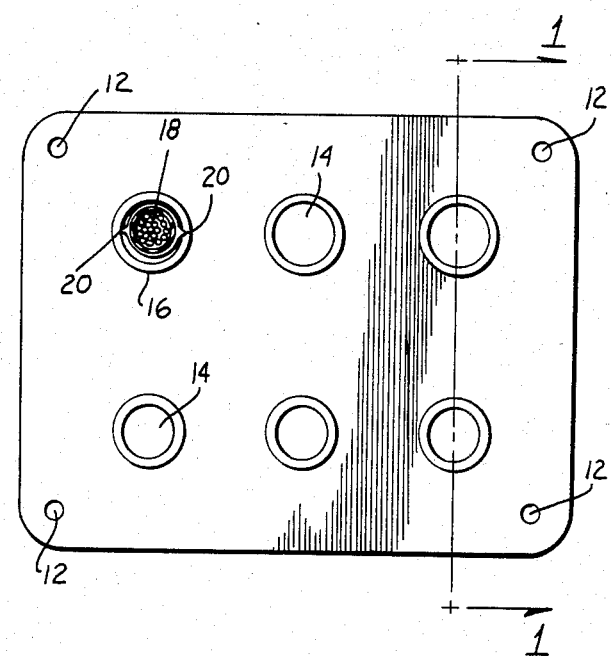
FIG. 2 is a plan view of a lead seal gasket of a type formed in accordance with prior art teachings.

Due to the variety of sizes and numbers of leads, prior art gaskets such as gasket 10 are usually stocked with no openings in them, except for mounting holes 12, and openings in depressions 14 are pierced or slit when the gasket is mounted to the motor. Referring now to FIG. 2, depression 14 which is surrounded by ridge 16 has not been pierced, and is shown in its original state. However, the area within upper ridge 16' has been slit, usually by a knife or similar tool, and a lead 18 having a circular cross section forced through it. The gasket material at the opposite sides of the slit, corresponding to the upper and lower edges shown in FIG. 2, are forced outwardly and make contact with the upper and lower sides of lead 18. However, the ends of the slit (corresponding to the left and right hand sides of the opening shown in FIG. 2) do not grip the lead, but instead form small openings 20 at either side thereof.

It will readily be understood that openings 20 could be avoided by cutting circular openings of the appropriate size in depressions 14; however, a special tool would be required for this operation and moreover a different tool would be required for each size hole. This approach is therefore not satisfactory for use either in a factory, where speed and economy are desired, or for field repairs, where special tools may not be available.

Figure 3:
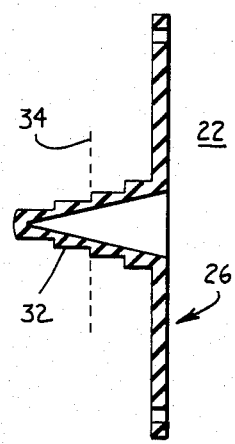
FIG. 3 is a transverse section of a lead gasket formed in accordance with the teachings of the present invention.

Turning to FIG. 3, a gasket is shown which is formed in accordance with the present invention. A generally conical lead bushing portion 32, formed integrally with the gasket, extends generally perpendicularly to the plane of the gasket and constitutes a resilient sealing bushing through which a motor lead may pass. In a presently preferred embodiment, the exterior surface of the bushing is constituted by a series of graduated cylindrical surfaces, which appear as stepped surfaces in FIG. 3. In the preferred embodiment the inner surface of the conical bushing is smooth, with no discrete graduations.

It will be appreciated that if bushing 32 is severed at some point, for instance along dashed line 34, a circular hole will be produced which matches the circular configuration of a motor lead. Of course the conical bushing 32 could be formed with a non-circular cross section to match non-circular lead configurations. By using the stepped exterior of the bushing as a guide, a severance plane can be selected which corresponds closely to the lead diameter. Preferably, the opening produced is somewhat smaller than the diameter of the lead, so that the bushing material will stretch as the lead is inserted and grip the exterior of the lead to form a tight seal.

Figure 4:
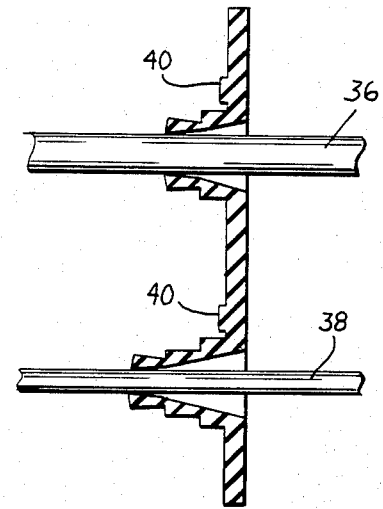
FIG. 4 is a transverse section of a gasket formed according to the present invention, illustrating the passage of leads therethrough.

FIG. 4 illustrates a gasket of the type shown in FIG. 3, the bushing portions thereof having been severed in different planes to tightly accommodate motor leads 36 and 38 which are of different diameters. It will be seen that the resilient bushing portions of the gasket have been stretched radially outwardly because of the passage of the leads, so as to grip the leads tightly. It will also be appreciated that a good seal can be accomplished for a wide range of lead sizes.

In the embodiment shown, indicia such as letters or numbers are molded in the surface of the gasket material as shown at 40. These indicia serve to identify the various bushings, and therefore the leads which pass through them, so as to aid in connecting the motor. Of course, indicia 40 can just as easily be formed by indented numerals or letters, at the election of the designer of the gasket.

A person skilled in the art will readily recognize that a gasket of the type disclosed can be formed of a number of different materials, including materials selected from commercially available rubbers and plastics. In a presently preferred embodiment the gasket is formed of a material such as Buna N rubber having a durometer value of approximately 65. Depending upon the nature of the atmosphere in which the motor is to be used, the temperatures to be encountered, and corrosive materials which may impinge upon the gasket, other materials may be selected although it is preferred that the gasket material be an elastomer which will stretch sufficiently to provide a tight seal about a lead, and which can be severed without the use of special tools.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

We claim:

1. An improved gasket for providing a tight seal between the enclosure of an electric motor and the leads extending therefrom, comprising:
   a generally planar member extending across an opening in the enclosure for engaging the edges thereof to provide a seal;
   a plurality of generally conical lead bushing members extending generally perpendicularly to said planar portion and spaced from the edges thereof;
   said bushings being severable at a plurality of planes along the length thereof to each thereby provide a generally resilient, circular passage for sealingly engaging motor leads of different sizes extending through the opening in the motor enclosure;
   the exterior of said lead bushing portions being provided with indicia comprising a graduated series of cylindrical surfaces along the length thereof for indicating appropriate points at which to be severed;
   the interior surface of each of said bushings comprising a generally continuous, conical surface.

2. An improved gasket according to claim 1, including an array of at least three of said conical lead bushing portions.

3. An improved gasket according to claim 2, further including lead-identifying indicia formed in said generally planar portion, each of said indicia being adjacent a respective bushing portion.

* * * * *